Aug. 17, 1965   M. MERZ   3,200,861
CHAIN SAW CHAIN
Filed April 2, 1963
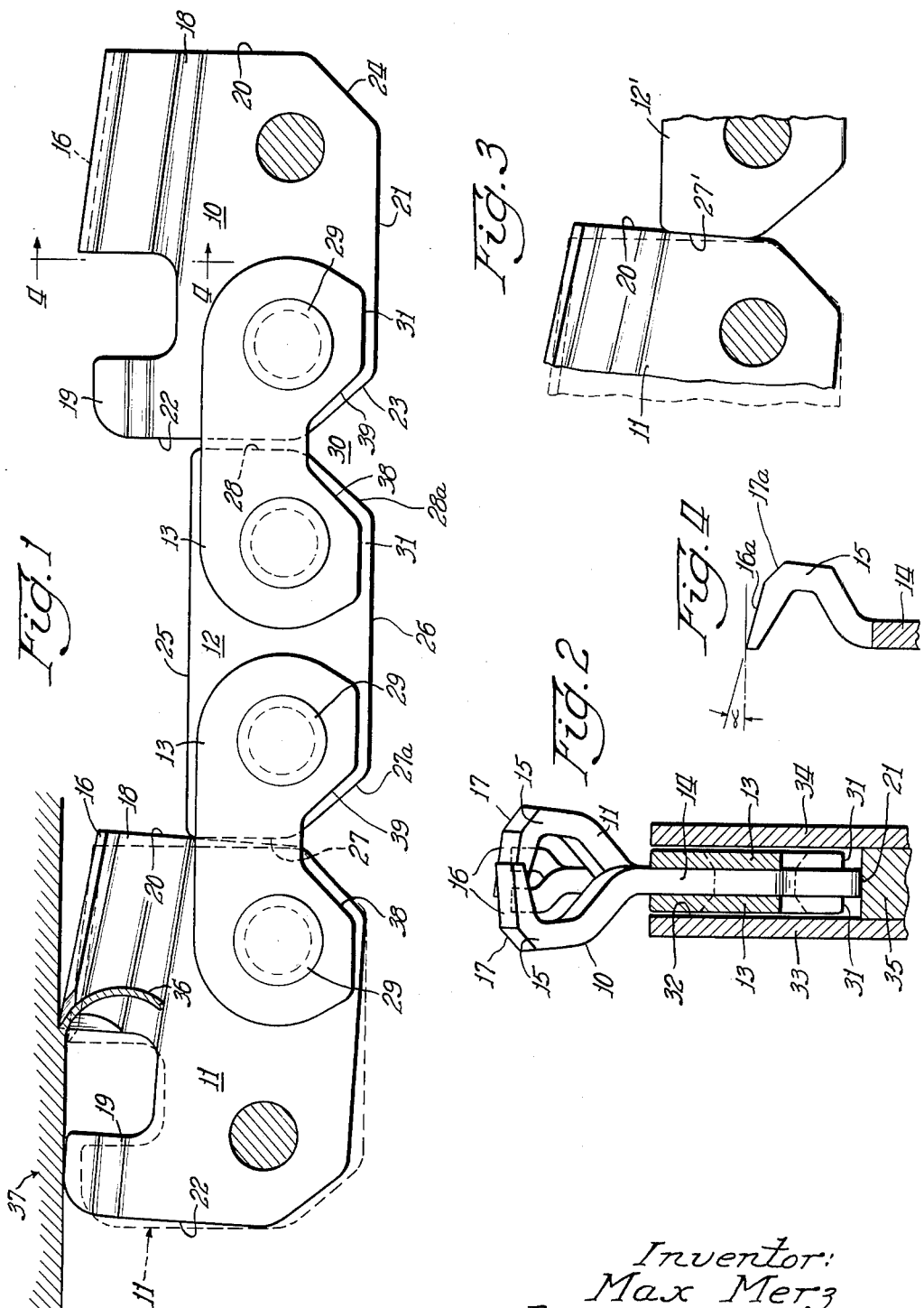
Inventor:
Max Merz
By: Frank R. Thienpont Atty

United States Patent Office 3,200,861
Patented Aug. 17, 1965

3,200,861
CHAIN SAW CHAIN
Max Merz, Los Angeles, Calif., assignor to Borg-Warner Corporation, Chicago, Ill., a corporation of Illinois
Filed Apr. 2, 1963, Ser. No. 285,161
7 Claims. (Cl. 143—135)

This application is a continuation-in-part application based on abandoned United States application Serial No. 824,544, filed July 2, 1959.

The present invention relates in general to saw chain for wood cutting chain saws and is more particularly concerned with improved saw chain tooth structure for such chain saws.

Wood cutting chain saws in common use at the present time include a guide bar having a peripheral groove therearound through which the saw chain travels during operation of the chain saw unit. In such conventional chain saw structures, a relatively small portion of the chain itself is disposed within the guiding groove and, as a result, the chain tends to wobble or snake in the kerf. The chain saw unit with which the improved saw chain disclosed herein is particularly adapted for operation includes a chain saw guide bar having a relatively deeper groove so that a greater portion of the chain may be disposed within the groove in order to thus afford better guiding of the chain during its operation.

Further, with the conventional chain saws each of the chain links is free to pivot relative to each other in either direction and this is sometimes the source of considerable trouble. For example, conventional saw chain links comprise a cutter portion at the relative rearward end thereof and a depth gauge portion at the forward end thereof. Initially, there is a predetermined differential in the heights of the depth gauge and the cutter portion so as to enable the cutter portion to dig into the wood or bite the wood and thus effect removal of a chip. It has been found, however, that with such conventional saw chain construction, with the link in its normal pose, the cutter portion digs into the wood and immediately thereafter the link tends to pivot outwardly around its rear pivot point until the depth gauge portion strikes the kerf in advance of the cutter element. Upon further forward progress of the chain the cutter link pivots further in an outward direction until the depth gauge causes the cutter portion to be completely removed from the wood. Thus, instead of chips of substantially uniform thickness being removed by the cutter chain, the chips are thin at one end, thicker towards the middle and thin again towards the trailing end thereof, which occurs due to the consequent pivotal action of the chain. This tendency of the chain to pivot outwardly upon engagement of the chain with the wood is most objectionable as it simply means that the chain does not cut as well as it otherwise would if it rode in a more nearly straight path.

Also, inasmuch as conventional chain saws have chain saw links which are free to pivot relative to each other in either direction, another source of considerable trouble is presented. In particular, as the chain passes around the small diameter of the end of the chain saw bar, and even more particularly when the end of the chain saw bar is provided with a roller to support the passing chain, the surface tension of the oil, sap, etc. present between the chain and the end or roller of the bar in conjunction with the usual flexibility of conventional chain, the chain will tend to follow around the small end of the bar and will either initially or after the bar has begun to wear, engage the bar at some well-defined oblique angle rather than being free from the bottom of the bar groove adjacent the end of the bar and blending into the groove gradually.

Thus, as the links of the chain pass through this well-defined oblique path, each link will abruptly engage the bar at the vertex of the angle and thereby cause extensive damaging effects on the bar at that point adjacent the end thereof as the chain leaves the roller or the end of the bar and engages the bottom surface of the lateral groove of the bar.

Conventional saw chain is made so that each of the links may pivot outwardly substantially freely with respect to each adjacent link and with such construction there is a continuous entering of the cutter links into and leaving of the links from the wood.

The present invention has for a principal object the provision of a saw chain wherein a predetermined minimum height differential between the cutting portion and the depth gauge portion of the cutter teeth is at all times maintained so as to minimize the tendency for the chain to ride out of the saw chain guide bar and cease cutting the wood properly.

More particularly, a principal object of the present invention is to provide an improved saw chain wherein abutment surfaces are provided on the trailing end of each cutter link and on the forward end of each link immediately behind the cutter link and wherein the links are so pivoted that the abutment surfaces function to become engaged when the cutter links engage the wood so that the cutter links will pivot through a limited angle to a predetermined extent during cutting action of the chain. Thus, at all times during cutting there is at least a predetermined height differential maintained between the cutter portions and the depth gauge portions of the cutter teeth.

Further particularly, an object of the present invention is to provide an improved saw chain wherein abutment surfaces are provided on the trailing end of each link and on the forward end of each link immediately behind each link and wherein the links are so pivotally interconnected so as to pivot through a limited angle. The abutment surfaces thereby function to become engaged after a predetermined angular pivotal movement to cause the chain to conform to a large circular path tangent to the path of the chain around the end of the chain saw bar and having a diameter many times larger than the diameter of the end portion in the area where the cutter links pass from the much smaller circular path around the end of the bar and move into the longitudinal path along the longitudinal edge of the bar. Thus, the chain is prevented from engaging the lateral portion of the bar adjacent the end thereof at some well defined oblique angle and will instead be caused to move smoothly from the small circular path around the end of the bar and gradually into engagement with the lateral edge of the chain saw bar in a manner such that the chain receiving surface of the chain saw bar groove will be substantially tangent to the large circular path of the engaging chain.

A further object of the present invention is to provide an improved chain saw chain wherein only the middle links of the chain extend to the inner extremity of the chain so that the chain actually rides within the guiding bar groove only on these inner link extremities. Although the inner links will deform, this structural arrangement will have the effect of preventing deformation of the metal at the inner extremity of the outer links inasmuch as the inner extremity is not in engagement with the bottom of the guide bar groove. As a consequence, the welding together of the inner and outer links and the opening of the connecting rivets, otherwise caused by the deformation of the adjacent inner and outer links, is likewise minimized or prevented.

Among the advantages of the saw chain comprising the subject matter of the present invention are the fact that it cuts a more uniform thickness of wood from the kerf and the further fact that due to only the one link contacting the inner surface of the guiding groove there is no tendency for the metal of which the links are composed to deform and become welded together or to open the rivets which hold the links in pivotal relationship with each other.

The foregoing objects and advantages of the present invention will become apparent from the following detailed description when read in conjunction with the accompanying drawing, wherein:

FIG. 1 is a fragmentary side view of a portion of saw chain constructed in accordance with the principles of the present invention;

FIG. 2 is a sectional view of a chain saw guide bar having saw chain, as shown in FIG. 1, disposed in the peripheral groove thereof;

FIG. 3 is a fragmentary view of a slight modification of the present invention; and FIG. 4 is an elevation view in section along the line 4—4 of FIG. 1.

With reference now to the drawing, wherein like reference numerals have been used in the different views to identify identical parts, the chain saw chain comprising the subject matter of the present invention consists of a plurality of cutter links 10 and 11, respectively of the right and left hand, spacer links 12 and connecting links 13. The chain can also be said to comprise a plurality of middle links pivotally interconnected by side links disposed on opposite sides thereof.

Each cutter link 10 or 11 comprises a main body portion 14, a shank or side cutter portion 15 and a toe cutter portion 16. The shank portion 15 and toe portion 16 are both sharpened to provide a cutting edge and are intersected by a slight chamfer 17 which is also sharpened to provide a cutting edge. The sharpened cutting edge on the toe portion 16 of each of the cutter links 10 is disposed generally near the medial portion of the cutter link and as the cutting edge on the link wears away, the toe portion may be sharpened until the cutter portion is actually very near the rear end 18 of the cutter link. The toe portion 16 comprises a flat surface 16a which is slanted outwardly away from the chamfered surface 17a and upwardly from the shank 15. Thus the toe portion 16 forms an acute angle $\alpha$ preferably of the order of not less than 15° with a plane which is perpendicular to the main body portion 14. At the forward end of each cutter link 10 there is provided a depth gauge 19, there being a definite predetermined height differential between the depth gauge 19 and the cutting edge of the toe portion 16 so that it is necessary to cut down the depth gauge portion as the cutter toe is sharpened. The rear portion 18 of the cutter links 10 is provided with a substantially flat and straight rear edge 20 which is substantially perpendicular to the inner extremity 21 of the cutter link and the forward portion of each cutter link 10 is provided with a substantially flat and straight portion 22 which is substantially perpendicular to the inner or riding edge 21. The cutter links 10 are each chamfered at 23 and 24 to facilitate engagement of the links with a driving sprocket (not shown).

The spacer links 12 which are disposed in longitudinal alignment with the cutter links 10 are formed very similarly to the cutter links with the exception that the depth gauge and cutter portions are removed therefrom. In other words, the cutter links 12 are formed with a flat outer extremity 25 which is substantially parallel to the inner extremity 26 thereof, substantially perpendicular front and rear edges or surfaces 27 and 28, and with chamfered portions 27a and 28a. The spacer links 12 and the cutter links 10 are all disposed in the middle of the chain and are interconnected pivotally by means of the plurality of connecting links 13. Each of the connecting links 13 is connected at one end to a cutter 10 and at the other end to a spacer link 12 by means of suitable rivets 29. The connecting links 13 are formed so as to provide no obstacle as the chain passes over a driving sprocket, the central slot 30 being provided for this purpose.

The links 10–13 are so pivotally interconnected and the surfaces 20 and 27 of links 11 and 12 are so spaced apart a predetermined distance that the chain links 11 and 12 are limited in their relative pivotal movement (FIGS. 1 and 3) to an angle B. The chain is thereby confined to a large circular path externally tangent to the path of the chain as it passes around the end of the chain saw bar and the path of the chain along the lateral edges of the bar. The angle B is limited to a range of from 0 to 5 degrees so that this diameter is many times larger than the diameter of the end portion of the bar. The chain will thus move smoothly from the small circular path around the end of the bar and gradually into engagement with the lateral edge of the chain bar in a manner such that the chain receiving surface of the lamination 35 of the bar groove 32 will be substantially tangent to the large circular path of the engaging chain. It was found that the angle B was most effective for this purpose when confined to a range of from 0 to 5 degrees but was particularly beneficially effective for this purpose when substantially confined to a range of 0 to 3 degrees.

It will be noted that the inner extremities 31 of the connecting links 13 do not extend inwardly as far as the inner extremities 21 and 26 of the cutter links 10 and 11 and spacer links 12. With such construction a welding together of the cutter links and connecting links or the spacer links and connecting links is avoided because swaging or smearing of the metal on the inner extremities 21 or 26 has no effect on the inner extremities 31 of the connecting links. Thus, the chain rides within the peripheral groove 32 defined in the edge of the chain saw guide bar, said guide bar comprising two outer laminations 33 and 34 with a central lamination 35 disposed therebetween. For a more thorough understanding of the guide bar reference should be had to my copending application Serial No. 824,647, filed July 2, 1959, and now abandoned. If desired, a wear strip may be seated on top of the inner lamination 35.

At the left end of FIG. 1, the dotted line cutter line 11 shows the normal position of the cutter 11 when it is not effectively cutting a chip from the kerf. The full line position of the cutter 11 shows the position thereof when the rear surface 20 of the cutter 11 is disposed in abutment with the front surface 27 of the spacer link 12. At this time there is a definite minimum height differential between the depth gauge 19 and the cutting edge of the toe portion 16 of the cutter 11, which differential is effective to remove a chip 36 from the wood, designated generally by reference numeral 37, said chip 36 being substantially of uniform thickness throughout the whole travel of the cutter link 11 through the log or other piece of wood being sawed.

The connecting links 13 are chamfered at 38 and 39. The chamfered portions 38 and 39 are substantially parallel to and do not extend as far inwardly as the corresponding chamfered portions on the spacer links and cutter elements are in their normal position as shown by the dotted line in FIG. 1. With such construction if there is any smearing or mashing of the metal on the chamfered portions of the spacer links or cutter links due to the actions of sprocket teeth riding on these chamfered portions, no binding action or restriction of movement will result between the spacer links and connecting links or the cutter links and connecting links.

In operation of the saw chain comprising the subject matter of the present invention the saw chain travels in the groove 32 at the outer edge or around the outer periphery of the saw chain guide bar, the inner extremities 21 of the cutter elements 10 and the inner extremities 26 of the spacer elements 12 riding along the top surface of inner laminations 35 while the side laminations 33 and 34 function to retain the chain in a relatively rigid lateral position. As a cutter link 10 or 11 commences to engage the wood, there is a tendency for the cutter link 10 or 11 to pivot outwardly about its rear pivot point and this has the effect of causing the depth gauge 19 of such cutter link 10 or 11 to strike the surface of the kerf in advance of the cutting edge. At some predetermined point in the pivotal movement of the cutter link 10 or 11, the abutment surface 20 strikes the abutment surface 27 and this limits the pivotal movement of the cutter link 10 or 11 such that there is always the predetermined height differential between the depth gauge 19 and the cutting edge 16. Thus, the chain removes chips substantially through the entire path of travel thereof through the log being cut.

As previously noted the surface 16a of the toe portion 16 of the cutter link 10 or 11 forms an acute angle α with a plane which is perpendicular to the main body portion 14. The angle α preferably should not be less than 15°. It has been found by experimentation that forming such an angled surface prevents binding of the saw chain in the kerf. As the chain moves through the kerf the forces acting on the cutter links are such that there is a tendency for the cutter links 10 and 11 to move the outside of the kerf and form a slightly wider kerf than if the surface 16a was formed at right angles to a plane perpendicular to the main body portion 14. The wider kerf accordingly reduces possibilities of binding.

FIG. 3 shows a slightly modified form of spacer line 12' where the front edge of surface 27' thereof is formed at an angle substantially equal to the angle at which the rear surface 20 of the cutter link 11 assumes when the latter is engagement with the spacer link forward surface 27'. Otherwise, the links of FIG. 3 are substantially identical with those of FIG. 1.

It is contemplated that numerous changes and modifications may be made in the present invention without departing from the spirit or scope thereof.

What is claimed is:

1. A chain saw adapted for travel in a guiding groove around the periphery of a chain saw guide bar and comprising a plurality of pivotally interconnected links, each pivotal interconnection between said links comprising a middle link extending in one longitudinal direction and a pair side links extending longitudinally in the opposite direction such that each middle link is respectively connected pivotally at its opposite ends to two sets of side links and each pair of side links are pivotally interconnected at their opposite ends to two middle links, certain of said links being formed at the outer exteremity thereof with cutting elements, said middle link and said side links having a depth such that both will travel in said guiding groove and the inner extremity of one of the links of each pivotal interconnection extending beyond the inner extremity of the remaining links of such pivotal interconnection for a fractional distance of less than one-half the overall depth of said side links whereby as the middle links and side links ride in said guiding groove the one link rides on the bottom of said guiding groove and interference with relative pivotal movement between said middle and side links due to possible deformation of a link riding on the bottom of the guiding groove is prevented.

2. A chain saw chain adapted for travel in a guiding groove around the periphery of a chain saw guide bar and comprising a plurality of pivotally interconnected links, each pivotal interconnection between said links comprising a middle link extending in one longitudinal direction and a pair of side links extending longitudinally in the opposite direction such that each middle link is respectively connected pivotally at its opposite ends to two sets of said side links and each pair of side links are pivotally interconnected at their opposite ends to two middle links, certain of said middle links being formed at the outer extremities thereof with cutting elements, said middle link and said side links having a depth such that both will travel in said guiding groove and the inner extremity of each of the middle links extending beyond the inner extremity of the side links for a fractional distance of less than one-half the overall depth of said side links whereby as the middle links and side links ride in said guiding groove the middle links each ride on the bottom of said guiding groove and interference with relative pivoted movement between said middle and side links due to possible deformation of a link riding on the bottom of the guiding groove is prevented.

3. A chain saw chain adapted for travel in a guiding groove around the periphery of a chain saw guide bar and comprising a plurality of cutter links, spacer links and connecting links, each of said cutter and spacer links being disposed in longitudinal array and pivotally interconnected at either end with a pair of said connecting links, said cutter, spacer and connecting links having a depth such that all will travel in said guiding groove the inner extremity of each of said cutter and spacer links extending beyond the inner extremity of said connecting links for a fractional distance of less than one-half the overall depth of said side links whereby as the cutter, spacer and connecting links ride in said guiding groove the cutter and spacer links all ride on the bottom of said guiding groove and interference with relative pivotal movement between said cutter, spacer, and connecting links due to possible deformation of the cutter and spacer links is prevented.

4. A chain saw chain adapted for travel in a guiding groove around the periphery of a chain saw guide bar and comprising a plurality of cutter links, spacer links and connecting links, each of said cutter links and spacer links being disposed in longitudinal array and pivotally interconnected at either end with a pair of said connecting links; each of said cutter links having a cutting portion disposed relatively rearwardly on the link and a depth gauge portion disposed relatively forwardly on the link, said cutter, spacer and connecting links having a depth such that all will travel in said guiding groove, the inner extremity of each of said cutter and spacer links extending beyond the inner extremity of said connecting links for a fractional distance of less than one-half the overall depth of said side links so that the cutter and spacer links each ride on the bottom of said guiding groove and interference with relative pivotal movement between said cutter, spacer, and connecting links due to possible deformation of the cutter and spacer links is prevented; each of said cutter links being formed with an abutment surface at the rear thereof; and each of said spacer links in alignment with and immediately to the rear of each cutter link having a cooperable abutment surface normally disposed in predetermined spaced relation with respect to the abutment surface on the next forward cutter link; whereby said abutment surfaces permit only limited outward pivoting of the cutter links of said chain so as to maintain at all times at least a predetermined minimum effective height differential between the cutting portion and the depth gauge portion of each of said cutter links.

5. A chain saw chain adapted for travel in a guiding groove around the periphery of a chain saw guide bar and comprising a plurality of cutter links, spacer links and connecting links; each of said cutter links and spacer links being disposed in alternate longitudinal array and pivotally interconnected at either end with a pair of said connecting links; each of said cutter links having a cutting portion disposed relatively rearwardly on the link and a depth gauge portion disposed relatively forwardly on the link; said cutter, spacer and connecting links having a depth such that they will travel in said guiding groove, the inner extremity of each of said cutter and spacer links comprising a substantially straight portion which extends beyond the inner extremity of said connecting links for a fractional distance of less than one-half the overall depth of said side links so that the cutter and spacer links each ride on the bottom of said guiding groove and interference with relative pivotal movement between said cutter, spacer and connecting links due to possible deformation of the cutter and spacer links is prevented; each of said cutter links being formed with an abutment surface at the rear thereof and substantially perpendicular to the straight portion thereof; and each of said spacer links in alignment with and immediately to the rear of each cutter link having a cooperable abutment surface substantially perpendicular to the straight portion thereof and disposed in predetermined spaced relation with respect to the abutment surface on the next forward cutter link; whereby said abutment surfaces permit only limited outward pivoting of the cutter links of said chain so as to maintain at all times at least a predetermined minimum effective height differential between the cutting portion and the depth gauge portion of each of said cutter links.

6. A chain saw chain adapted for travel in a guiding groove around the periphery of a chain saw guide bar and comprising a plurality of pivotally interconnected links, each pivotal interconnection between said links comprising a middle link extending in one longitudinal direction and a pair of side links extending longitudinally in the opposite direction such that each middle link is respectively connected pivotally at its opposite ends to two sets of side links and each pair of side links are pivotally interconnected at their opposite ends to two middle links, certain of said links being formed at the outer extremity thereof with cutting elements, said middle link and said side links having a depth such that both will travel in said guiding groove and the inner extremity of the middle link of each pivotal interconnection extending beyond the inner extremity of the remaining links of such pivotal interconnection for a fractional distance of less than one-half the overall depth of said side links whereby as the middle links and side links ride in said guiding groove the one link rides on the bottom of said guiding groove and interference with relative pivotal movement between said middle and side links due to possible deformation of a link riding on the bottom of the guiding groove is prevented.

7. A chain saw chain adapted for travel in a guiding groove around the periphery of a chain saw guide bar and comprising a plurality of pivotally interconnected links, each pivotal interconnection between said links comprising a middle link extending in one longitudinal direction and a pair of side links extending longitudinally in the opposite direction such that each middle link is respectively connected pivotally at its opposite ends to two sets of side links and each pair of side links are pivotally interconnected at their opposite ends to two middle links, certain of said links being formed at the outer extremity thereof with cutting elements, said middle link and said side links having a depth such that both will travel in said guiding groove and the inner extremity of the side links of each pivotal interconnection extending beyond the inner extremity of the remaining links of such pivotal interconnection for a fractional distance of less than one-half the overall depth of said side links whereby as the middle links and side links ride in said guiding groove the one link rides on the bottom of said guiding groove and interference with relative pivotal movement between said middle and side links due to possible deformation of a link riding on the bottom of the guiding groove is prevented.

References Cited by the Examiner
UNITED STATES PATENTS

| | | | |
|---|---|---|---|
| 2,622,636 | 12/52 | Cox. | |
| 2,664,120 | 12/53 | Hinkley | 143—135 |
| 2,902,068 | 9/59 | Gudmundsen | 143—135 |

WILLIAM W. DYER, Jr., *Primary Examiner.*

J. SPENCER OVERHOLSER, *Examiner.*